United States Patent [19]
Manghisi et al.

[11] 3,930,008
[45] Dec. 30, 1975

[54] 4-ARYL-5-AMINOALKYL-4-OXAZOLIN-2-ONES

[75] Inventors: Elso Manghisi; Giuseppe Cascio, both of Monza, Italy

[73] Assignee: Istituto Luso Farmaco d'Italia S.r.l., Milan, Italy

[22] Filed: Oct. 3, 1973

[21] Appl. No.: 403,275

[30] Foreign Application Priority Data
Oct. 16, 1972 Italy................................. 30536/72
Aug. 22, 1973 Italy................................. 28115/73

[52] U.S. Cl. .................. 260/268 PH; 260/243 B; 260/247.1 M; 260/247.2 A; 260/247.2 B; 260/268 H; 260/293.67; 260/294.8 E; 260/295 D; 424/250

[51] Int. Cl.²......................................... C07D 295/12

[58] Field of Search ....................................... 260/268

[56] References Cited
UNITED STATES PATENTS
3,576,808  4/1971  Schut........................... 260/268 PH

*Primary Examiner*—Donald G. Daus
*Assistant Examiner*—Jose Tovar
*Attorney, Agent, or Firm*—Stevens, Davis, Miller & Mosher

[57] ABSTRACT

A class of 4-aryl-5-aminoalkyl-4-oxazolin-2-ones having the general formula:

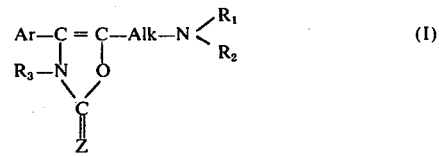

or a pharmaceutically acceptable salt thereof, in which Ar represents a mono or polycyclic, substituted or unsubstituted, aryl radical, Alk represents a linear or branched saturated or unsaturated hydrocarbon radical of one to three carbon atoms,

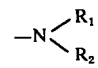

represents a secondary or tertiary amino residue, Z represents an oxygen or sulphur atom, or an imino group, and $R_3$ represents a hydrogen atom or a lower alkyl, a lower free or etherified hydroxyalkyl, an arylalkyl, a dialkylaminoalkyl, a lower aliphatic acyl, a lower aromatic acyl or a carbamoyl radical are provided with depressive or stimulative activity on the central nervous system, with hypotensive, muscular relaxing properties, which inhibits aggregation of platelets and which is antiarrhythmic and antihistaminic.

1 Claim, No Drawings

4-ARYL-5-AMINOALKYL-4-OXAZOLIN-2-ONES

This invention relates to 4-aryl-5-aminoalkyl-4-oxazolin-2-ones.

The present invention provides compounds of general formula (I)

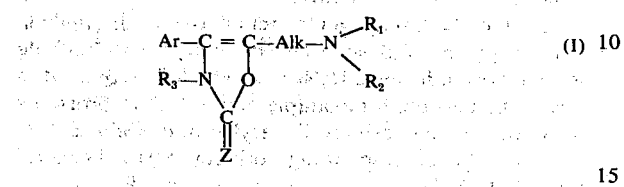

In this formula Ar represents a mono- or polycarbocyclic aryl group, is especially a monocarbocyclic aryl group such as phenyl or substituted phenyl, which may have one or more of the same or different substituents. Suitable substituents include lower alkyl, for example methyl, ethyl, n-propyl and isopropyl, trifluoromethyl, lower alkoxy, for example methoxy, ethoxy, n-propyloxy, isopropyloxy and n-butyloxy, lower alkeneoxy, for example vinyloxy and allyloxy, lower alkylenedioxy, for example methylenedioxy, halogen, for example fluorine, chlorine or bromine, alkylmercapto, for example methylmercapto or ethylmercapto, nitro, amino, including lower N,N-dialkylamino, for example N,N-dimethylamino or N,N- diethylamino. The carbocyclic aryl radical may also be a bicyclic radical such as naphthyl, 1-naphthyl, or 2-naphthyl, or substituted naphthyl, which substituents can be the same or different such as alkylnaphthyl, trifluoromethylnaphthyl, alkoxynaphthyl, alkeneoxynaphthyl, halogenonaphthyl or aminonaphthyl.

Alk represents a linear or branched saturated or unsaturated hydrocarbon radical comprising 1 to 3 carbon atoms.

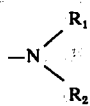

represents a substituted or unsubstituted amino group in which the substituents may be, especially, hydrogen atoms or lower alkyl, carbocyclic monocyclic aryl, particularly phenyl, monocarbocyclic arylalkyl, particularly phenylalkyl.

The N-monosubstituted amino groups may thus be for example, N-alkylamine, for example methylamino, ethylamino or propylamino, N-cycloalkylamino, for example N-cyclohexylamino, N-hydroxyalkylamino for example N-2-hydroxyethylamino, N-arylalkylamino, for example benzylamino, N-dialkylaminoethylamino, for example N,N-diethylenediamino, N-arylamino, for example N-phenylamino or substituted N-phenylamino. The N,N-disubstituted amino groups may be, for example, N,N-dialkylamino, for example N,N-dimethylamino, N-methyl-N-ethylamino, N,N-diethylamino, N,N-di-n-propylamino, N,N-di-isopropylamino or N-methyl-diethylaminoethylamino, and N-cycloalkyl-N-alkylamino in which the cycloalkyl has from 3 to 8 atoms, for example N-cyclopentyl-N-methylamino or N-cyclohexyl-N-ethylamino, N-lower alkyl-N-phenylalkylamino, for example N-benzyl-N-methylamino or N-ethyl-N-phenylethylamino, or any other disubstituted amino group such as N-hydroxyalkyl-N-alkyl-amino in which the hydroxyl is separated from the nitrogen by at least two carbon atoms, for example N-ethyl-N-(2-hydroxyethyl)amino, or N,N-dihydroxyalkylamino, for example N,N-di(2-hydroxyethyl)amino.

The radical

may also be a N,N-alkyleneimino group in which the alkylene has from 3 to 8 carbon atoms, for example 1-pyrrolidino, 1-piperidino, 1-(4-(p-chlorophenyl)-1,2,3,6-tetrahydropyridino), 2-methyl-1piperidino, 4-hydroxy-4-phenyl-1-piperidino, 4-hydroxy- 4-p-chlorophenyl-1-piperidino, 4-carboxamino-4-phenyl-1-piperidino, 4-benzolyamino-1-piperidino or 4-p-fluorobenzoyl-1-piperidino, 1-N,N-(1,6-hexylene)imino or 1-N,N (1,7-heptylene) imino, N,N-oxoalkylene-imino in which the alkylene preferably has four carbons atoms, for example 4-morpholino, N,N-thio-alkylene-imino, in which the alkylene preferably has four carbon atoms, for example 4-thio-morpholine, or N,N-azaalkylene-imino in which the alkylene has from 4 to 6 carbon atoms and in which the "aza" nitrogen may be substituted by, for example, lower alkyl, for example methyl, ethyl or propyl, lower hydroxyalkyl, for example hydroxyethyl, lower alkoxy alkyl, for example methoxyethyl, lower alkoxyloxyalkyl, for example acetoxyethyl, lower arylalkyl, for example benzyl, diphenylmethyl, 2-phenylethyl, 2-3'-indolyl-ethyl, or a monocarbocyclic aryl, preferably phenyl, unsubstituted or substituted with halogen atoms or alkyl, lower alkoxy or nitro groups, for example phenyl, 2-tolyl, 2,3-xylyl, 4-chlorophenyl or 2-methoxyphenyl or, finally, a heterocyclic monocarbocyclic aryl, for example 2-pyridino, 2-furano or 2-thiopeno, such as piperazino, 4-methyl-1-piperazino, 4-ethyl-1-piperazino, 4-(2-hydroxyethyl)-1-piperazino, 4-(2-acetoxyethyl)-1-piperazino, 4-benzyl-1-piperazino, 4-(2'-(3'-indolyl)-ethyl-1-piperazino, 4-phenyl-1-piperazino, 4-p-chlorophenyl-1-piperazino, 4,2'-methoxyphenyl-1-piperazino, 4,2'-pyridyl-1-piperazino or 4,3'-pyridyl-1-piperazino. Z represents an atom of oxygen or sulphur or an imino group, In this latter case the compound is generally in equilibrium with the corresponding tautomeric 2-amino-oxazole.

$R_3$ represents a hydrogen atom or a linear or branched lower alkyl, for example methyl, ethyl, propyl, or isopropyl, or a free or etherified lower hydroxyalkyl, for example 2-hydroxyethyl, 3-hydroxypropyl, 2-methoxyethyl, 3-methoxypropyl or 2'-hydroxyethoxyethyl, an arylalkyl, for example benzyl, a dialkylamino alkyl, for example N,N-diethylaminoethyl, or a lower aliphatic acyl, for example acetyl, propionyl, carbamoyl, N-alkylcarbamoyl, N-phenylcarbamoyl, N-alkylthiocarbamoyl or N-phenylthiocarbamoyl, or an aromatic acyl unsubstituted or substituted with halogen atoms or methoxy groups, for example benzoyl, p-chlorobenzyl, p-methoxybenzoyl or 3,4,5-trimethoxybenzoyl. The invention also relates to processes for preparing the substances of general formula (I).

The compounds of the present invention, with the exception of those which carry substituents which can interfere with the reacting compounds, can be prepared by reacting compounds of general formula II:

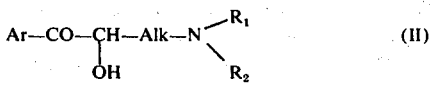  (II)

in which, Ar, Alk and

have the meanings given above, with phosgene, thiophosgene, ethyl chlorocarbonate, or ethyl carbonate and then with an amine of formula: $R_3NH_2$ in which $R_3$ has the meanings given above, generally in the presence of a proton acceptor such as triethylamine or dimethylaniline and in a non-polar solvent, such as chloroform, benzene or toluene and at a temperature between −10°C and +50°C.

The substances of formula (III) are formed as intermediate products

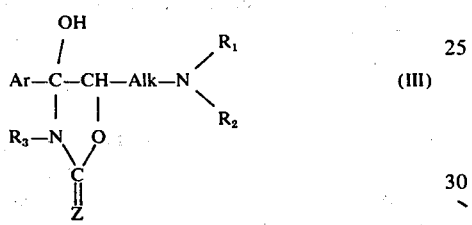  (III)

which either spontaneously or, by, generally hot, treatment with organic or inorganic acids such as glacial acetic acid, dilute mineral acids or p-toluene-sulphonic acid or other dehydrating agents give the compounds of formula I.

The products of the present invention can also be obtained by reacting the products of formula II, suitably in the molten state, with an alkylisocyanate, arylalkylisocyanate, arylisocyanate, alkylurethane, carbamoylchloride, or alkyl isothiocyanate, followed by acid treatment. The products of general formula I can also be obtained by reacting the compounds of general formula II with isothiocyanic acid, generally under hot conditions in the presence of solvents, or with cyanamide, generally under hot conditions in a hydroalcoholic environment.

Another method of preparing the products of the present invention consists of reacting the compounds of formula IV, generally under hot conditions in a non polar solvent such as benzene, toluene or xylene,

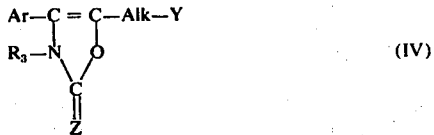  (IV)

in which Ar, Alk, $R_3$ and Z have the meanings given above and Y represents a halogen atom or a tosyl radical, with an amine of formula:

Finally the products of general formula I in which $R_3$ is not a hydrogen atom can be obtained from the corresponding compounds in which $R_3$ represents a hydrogen atom, by alkylation or acylation, for example after preparing the sodium salt, with compounds of general formula $R_3X$ in which $R_3$ is as defined above and X represents a halogen atom, a tosyl radical or the acyl residue of a mixed anhydride.

Suitable alkylating agents include oxides of ethylene and propylene and suitable acylating agents include isocyanates of formula $R_4NCO$ in which $R_4$ represents a lower alkyl group, for example methyl, ethyl, propyl or butyl or a monocarbocyclic aryl group, for example phenyl, or the corresponding isothiocyanates of general formula $R_4NCS$.

A further method for preparing products of general formula I in which $R_3$ represents a hydrogen atom consists of reacting, suitably under hot conditions, compounds of general formula V

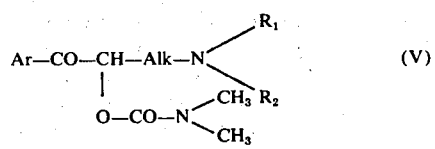  (V)

with ammonium acetate in the presence of acetic acid.

The compounds of general formula II can be prepared as described in Italian Pat. Application No. 23444 A/72 filed 22.4.1972. Generally compounds of general formula VI:

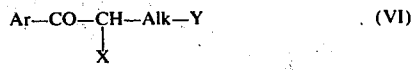  (VI)

in which X and Y represent halogen atoms, are reacted with alcoholates of alkali metals or alkaline earth metals, and then with amines of formula

The intermediate products of general formula IV can be obtained by reacting the compounds of general formula VI with alkaline alcoholates followed by acid hydrolysis to give intermediates of the presumed formula

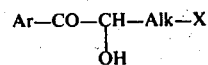

which are then subjected to ring closure to give the oxazolinones by the methods given above.

Salts of the compounds of general formula I can be prepared with pharmaceutically acceptable inorganic acids, for example hydrochloric, hydrobromic, nitric, sulphuric and phosphoric acids, and with organic carbonyl acids, for example acetic, propionic, glycolic, malonic, succinic, maleic, hydroxymaleic, fumaric, malic, tartaric, citric, glucuronic, benzoic, mandelic, salicylic, 4-aminosalicyclic, 2-phenoxybenzoic, 2-acetoxybenzoic, pamoic, nicotinic and isonicotinic acids, and with organic sulphonic acids, for example methanesulphonic, ethanesulphonic, 2-hydroxyethanesulphonic, ethane 1,2-disulphonic, p-toluenesulphonic and naphthene-2-sulphonic acids. Mono or poly salts are formed depending on the number of salifiable groups present in the molecule.

The products of general formula I and their pharmaceutically acceptable salts have a strong depressive or stimulative action on the central nervous system, and, in addition, have hypotensive, muscular relaxing properties, inhibit aggregation of platelets, and are antiarrhythmic and antihistaminic.

They can be administered for example orally, by injection or through the rectum using appropriate pharmaceutical formulations which may be solid or liquid as suspensions or solutions. Examples of such formulations include tablets, capsules, phials, syrups, and suppositories.

The following Tables summarise the pharmacological characteristics of a number of the compounds of the present invention which are denoted by the following symbols:

LR 466 : 4-p-fluorophenyl-5-B-(4-phenyl-piperazino)-ethyl-4-oxazolin-2-one
LR 496 : 4-p-fluorophenyl-5-N-piperidinoethyl-4-oxazolin-2-one maleate
LR 502 : 3-butyl-4-p-fluorophenyl-5-B-(4-phenyl-piperazino)-ethyl-4-oxazolin-2-one
LR 503 : 4-phenyl-5-B-(4-phenyl-piperazino)-ethyl-4-oxazolin-2-one
LR 504 : 4-p-chlorophenyl-5-B-(4-phenyl-piperazino)-ethyl-4-oxazolin-2-one
LR 511 : 4-p-fluorophenyl-5-b-(4-o-methoxyphenyl-piperazino)-ethyl-4-oxazolin-2-one
LR 512 : 3-ethyl-4-p-fluorophenyl-5-B-(4-phenyl-piperazino)-ethyl-4-oxazolin-2-one
LR 513 : 3-benzyl-4-p-fluorophenyl-5-B-(4-phenyl-piperazino)-ethyl-4-oxazolin-2-one
LR 514 : 3-acetyl-4-p-fluorophenyl-5-B-(4-phenyl-piperazino)-ethyl-4-oxazolin-2-one
LR 515 : 3-benzoyl-4-p-fluorophenyl-5-B-(4-phenyl-piperazino)-ethyl-4-oxazolin-2-one hydrochloride
LR 516 : 3-diethylaminoethyl-4-p-fluorophenyl-5-B-(4-phenyl-piperazino)-ethyl-4-oxazolin-2-one
LR 522 : 4-p-methoxyphenyl-5-B-(4-phenyl-piperazino)--ethyl-4-oxazolin-2-one
LR 533 : 3-methyl-4-p-fluorophenyl-5-B-(4-phenyl-piperazino)-ethyl-4-oxazolin-2-one
LR 534 : 4-p-fluorophenyl-5-diethylaminoethyl-4-oxazolin-2-one-maleate
LR 542 : 4-p-fluorophenyl-5-((4-benzamidopiperidino)ethyl --oxazolin-2-one
LR 552 : 4-p-fluorophenyl-5-B-(4-(2-pyridyl)-piperazino)-ethyl-4-oxazolin-2-one
LR 553 : 3-methylaminocarbonyl-4-p-fluorophenyl-5-B-(4-phenyl-piperazino)-ethyl-4-oxazolin-2-one hydrochloride
LR 567 : 4-p-fluorophenyl-5-((4-(p-chlorophenyl)-1,2,3,6-tetrahydropyridino)-ethyl)-4-oxazolin-2-one
LR 576 : 4-p-fluorophenyl-5-((N-methyl-phenethylamino)-ethyl)-4-oxazolin-2-one maleate
LR 577 : 4-p-fluorophenyl-5-((N-methyl-diethylaminoethyl-amino)-ethyl)-4-oxazolin-2-one maleate
LR 580 : 3-methyl-4-p-fluorophenyl-5-diethylamino-ethyl-4-oxazolin-2-one citrate
LR 581 : 4-phenyl-5-diethylaminoethyl-4-oxazoline-2-one maleate
LR 583 : 4-p-fluorophenyl-5-B-(4-methyl)-piperazino)-ethyl-4-oxazolin-2-one
LR 585 : 3-acetyl-4-p-fluorophenyl-5-B-(4-o-methoxyphenyl-piperazino)-ethyl-4-oxazolin-2-one hydrochloride

| Compounds | DL 50 mouse mg/Kg/ip (intraperitoneally) | Motility-mouse mg/Kg/bw (body weight) per os | | Curiosity Cage-mouse mg/Kg/bw per os | inclined screen-mouse mg/Kg/bw per os | Rotating rod mg/Kg/bw per os | |
|---|---|---|---|---|---|---|---|
| | | spontaneous | amphetamine | | | rat | mouse |
| LR 466 | >1000 | 3.6 = 50% | 5.4 = 50% | 4.5 = 50% | 50 = 50% | 8.5 = 50% | 13 = 50% |
| LR 511 | >1000 | 3.2 = 50% | 4.6 = 50% | 5.9 = 50% | 61 = 50% | 13.4 = 50% | 17.3 = 50% |
| LR 496 | 75 | 20 = 36% | – | – | – | – | – |
| LR 504 | 1000 | 4.4 = 50% | 4.7 = 50% | 7.9 = 50% | 200 = 10% | 17.5 = 50% | 52 = 50% |
| LR 522 | 350 | 70 = 26% | 70 = 27% | 70 = 10% | – | – | 35 = 50% |
| LR 503 | >1000 | 60 = 50% | 51 = 50% | 70 = 50% | 100 = 30% | 13.8 = 50% | 70 = 50% |
| LR 533 | 750 | 19.5 = 50% | 21 = 50% | 33.5 = 50% | 200 = 20% | – | 47 = 50% |
| LR 512 | 750 | 15.4 = 50% | 17 = 50% | 11.8 = 50% | 150 = 50% | 16 = 50% | 46 = 50% |
| LR 513 | >1000 | 48.7 = 50% | 100 = 40% | 100 = 10% | – | – | 200 = 40% |
| LR 516 | 350 | 60 = 54% | 60 = 27% | 60 = 50% | 70 = 10% | – | – |
| LR 502 | 750 | 6 = 50% | 5.4 = 50% | 23 = 50% | 75 = 10% | 28.5 = 10% | 50 = 50% |
| LR 514 | 350 | 2.7 = 50% | 4.7 = 50% | 6.2 = 50% | 45 = 50% | 6 = 50% | 15.8 = 50% |
| LR 515 | 750 | 4 = 50% | 9.3 = 50% | 14.6 = 50% | 150 = 20% | 100 = 28% | 132 = 50% |
| LR 534 | 150 | 30 = 48% | – | 30 = 20% | – | – | – |
| LR 542 | >1000 | 200 = 43% | – | 200 = 10% | – | – | 200 = 28% |
| LR 552 | >1000 | 3.8 = 50% | – | 40 = 50% | 200 = 50% | – | 120 = 50% |
| LR 553 | 750 | 16.5 = 50% | 9.9 = 50% | 18.3 = 50% | 200 = 20% | 10 = 50% | 15.8 = 50% |
| LR 567 | >1000 | 500 = 49% | 500 = 77% | 500 = 40% | – | – | 300 = 50% |
| LR 576 | 155 | 28 = 50% | – | 30 = 50% | 40 = 10% | – | 40 = 20% |
| LR 583 | 350 | 100 = 20% | – | 100 = 20% | – | – | 100 = 20% |
| LR 585 | 190 | 4 = 50% | – | 6 = 50% | – | 10 = 50% | 25 = 50% |

| Compounds | Stereotype-rat mg/Kg/bw per os | | Vomit-Dog mg/Kg/bw | Catalepsy mg/Kg/bw per os | | Shock-mouse mg/Kg/bw per os | Conditioned reflexes- rat mg/Kg/bw per os | |
|---|---|---|---|---|---|---|---|---|
| | Amphetamine | Apomorphine | Apomorphine per os | mouse | rat | triptamine | Avoidance | DW |
| LR 466 | 5.1 = 50% | 48 = 50% | 4.5 = 50% | 35 = 50% | 87 = 50% | 23.5 = 50% | 3.8 = 50% | 53.5 = 50% |
| LR 511 | 13.5 = 50% | 15.9 = 50% | 2.5 = 50% | 37.4 = 50% | 63 = 50% | 9.8 = 50% | 3.5 = 50% | 7.1 = 50% |
| LR 496 | 15 = 20% | 15 = 40% | – | – | – | – | – | – |

-continued

| Compounds | Stereotype-rat mg/Kg/bw per os | | Vomit-Dog mg/Kg/bw Apomorphine per os | Catalepsy mg/Kg/bw per os | | Shock-mouse mg/Kg/bw per os triptamine | Conditioned reflexes-rat mg/Kg/bw per os | |
|---|---|---|---|---|---|---|---|---|
| | Amphetamine | Apomorphine | | mouse | rat | | Avoidance | DW |
| LR 504 | 56 = 50% | — | — | 50 = 50% | — | — | 28.2 = 50% | — |
| LR 522 | 100 = 50% | 47 = 50% | — | — | — | — | — | — |
| LR 503 | 100 = 50% | 200 = 50% | — | 50 = 33% | 63 = 50% | — | 8.2 = 50% | 16.4 = 50% |
| LR 533 | 75 = 50% | 112 = 50% | — | 75 = 50% | — | — | 13.2 = 50% | 100 = 94% |
| LR 512 | 24.1 = 50% | 75 = 50% | — | 75 = 50% | — | — | 15 = 50% | — |
| LR 513 | 200 = 50% | 200 = 50% | — | — | — | — | 30 = 50% | — |
| LR 516 | 100 = 40% | 25 = 50% | — | — | — | — | 60 = 50% | — |
| LR 502 | 150 = 40% | 150 = 40% | — | 37.5 = 50% | — | — | 19 = 50% | — |
| LR 514 | 18.5 = 50% | 44 = 50% | 2.5 = 50% | 18.5 = 50% | 30.5 = 50% | 8.3 = 50% | 4.4 = 50% | 4.5 = 50% |
| LR 515 | 90 = 30% | 150 = 40% | 9 = 50% | 75 = 13% | — | 25 = 50% | — | — |
| LR 534 | — | — | — | 30 = 13% | — | — | — | — |
| LR 542 | — | — | — | 200 = 23% | — | — | — | — |
| LR 552 | — | 200 = 30% | — | 120 = 50% | — | — | — | — |
| LR 553 | 9.5 = 50% | 180 = 30% | — | 47 = 50% | — | — | 6.8 = 50% | — |
| LR 567 | — | — | — | — | — | — | — | — |
| LR 576 | — | — | — | — | — | — | — | — |
| LR 583 | — | — | — | — | — | — | — | — |
| LR 585 | 11.4 = 50% | 14.5 = 50% | — | 25 = 50% | 30 = 50% | — | 4 = 50% | — |

| Compounds | Aggressivity-mouse mg/Kg/bw per os | Strengthening of barbituric sleep-mouse mg/Kg/bw per os | Lethality Noradrenalin-mouse mg/Kg/bw per os |
|---|---|---|---|
| LR 466 | 8 = 50% | 33 = 50% | 70 = 50% |
| LR 511 | 3 = 50% | 41 = 50% | 17.9 = 50% |
| LR 496 | — | — | — |
| LR 504 | 10 = 20% | 27.5 = 50% | 100 = 50% |
| LR 522 | — | 60 = 50% | — |
| LR 503 | 10 = 30% | 86 = 50% | 100 = 50% |
| LR 533 | 10 = 60% | 76.5 = 50% | 200 = 10% |
| LR 512 | — | 40 = 50% | 75 = 30% |
| LR 513 | — | 100 = 50% | 100 = 20% |
| LR 516 | — | 70 = 50% | — |
| LR 502 | — | 99 = 50% | 75 = 50% |
| LR 514 | 4 = 50% | 9.1 = 50% | 37.5 = 50% |
| LR 515 | — | 150 = 50% | 75 = 40% |
| LR 534 | — | — | — |
| LR 542 | — | — | — |
| LR 552 | — | — | — |
| LR 553 | — | — | — |
| LR 567 | — | — | — |
| LR 576 | — | — | — |
| LR 583 | — | — | — |
| LR 585 | 5 = 50% | — | — |

| Compounds | DL 50-mouse mg/Kg/ip | Arrhythmia CaCl₂-rat mg/Kg/iv (intravenously) | Isolated auricula-rabbit γ/ml |
|---|---|---|---|
| 496 | 75 | — | 50 = 50% |
| 502 | 750 | — | 10 = 24% |
| 534 | 150 | 3.7 = 50% | 30 = 50% |
| 576 | 155 | 3.75 = 50% | 10 = 29% |
| 577 | 170 | — | 30 = 50% |
| 580 | 220 | 10 = 20% | — |
| 581 | 90 | 5 = 40% | — |
| 583 | 350 | 14 = 50% | — |

The following Examples further illustrate the present invention. The melting and boiling points are not corrected.

The identity of the substances and their purity have been ascertained by elementary analyses of carbon, hydrogen, and nitrogen (and halogens where present), infrared specta, N.M.R. (nuclear magnetic resonance) and U.V. (ultra-violet).

EXAMPLE 1

4-p-fluorophenyl-5-B-(4-phenyl-piperazino)-ethyl-4-oxazolin-2-one

To 35 cc. of a 20% solution of phosgene in toluene, agitated and cooled to 0°C, are added over 30 minutes a solution of 20 g of 1-p-fluoro-benzoyl-1-hydroxy-3-N-(N'-phenyl) piperazino-propane and 7.3 g of triethylamine in 200 cc of anhydrous chloroform. It is agitated at ambient temperature for 5 hours, cooled to 0°C and the solution saturated with gaseous ammonia. The solution is agitated at ambient temperature for 3 hours, filtered and the filtrate dried under reduced pressure. m.p. = 192°C (by alcohol) Similarly the following are prepared:

4-p-fluorophenyl-5-B-(4-o-methoxyphenyl-piperazino)-ethyl-4-oxazolin-2-one m.p. = 154°C (by alcohol)

4-p-fluorophenyl-5-N-piperidinoethyl-4-oxazolin-2-one maleate m.p. = 272°C (by alcohol)

4-p-chlorophenyl-5-B-(4-phenyl-piperazino)-ethyl-4-oxazolin-2-one m.p. = 195°C (by alcohol)

4-p-methoxyphenyl-5-B-(4-phenyl-piperazino)-ethyl-4-oxazolin-2-one m.p. = 188°C (by alcohol)

4-p-fluorophenyl-5-diethylaminoethyl-4-oxazolin-2-one maleate m.p. = 153°C (by alcohol)

4-p-fluorophenyl-5-((4-benzamido-piperazino)-ethyl)-4-oxazolin-2-one m.p. = 229°C (by alcohol)

4-p-fluorophenyl-5-B-(4-pyridyl)-piperzino)-ethyl-4-oxazolin-2-one m.p. = 172°C (by alcohol)

4-p-fluorophenyl-5-((4-p-chlorophenyl)-1,2,3,6-tetrahydropyridino)-ethyl)-4-oxazolin-2-one m.p. = 205°C (by alcohol)

4-p-fluorophenyl-5-((N-methyl-phenethylamino)-ethyl)-4-oxazolin-2-one maleate m.p. = 155°C (by alcohol)

4-p-fluorophenyl-5-((N-methyl-diethylaminoethylamino)-ethyl)-4-oxazolin-2-one dimaleate m.p. = 149°C. (by alcohol)

4-phenyl-5-diethylaminoethyl-4-oxazolin-2-one maleate m.p. = 159°C (by alcohol)

4-p-fluorophenyl-5-B-(4-methyl-piperazino)-ethyl-4-oxazolin-2-one m.p. = 159°C (by alcohol) Similarly, by substituting the ammonia with the appropriate amines, the following are prepared:

3-methyl-4-p-fluorophenyl-5-B-(4-phenyl-piperazino)-ethyl-4-oxazolin-2-one m.p. = 104°C (by alcohol)

3-ethyl-4-p-fluorophenyl-5-B-(4-phenyl-piperazino)-ethyl-4-oxazolin-2-one m.p. = 85°C (by alcohol)

3-benzyl-4-p-fluorophenyl-5-B-(4-phenyl-piperazino)-ethyl-4-oxazolin-2-one m.p. = 120°C (by alcohol)

3-diethylaminoethyl-4-p-fluorophenyl-5-B-(4-phenyl)-piperazino)-ethyl-4-oxazolin-2-one m.p. = 71°C (by hexane)

3-diethylaminoethyl-4-p-fluorophenyl-5-diethylaminoethyl-4-oxazolin-2-one b.p. = 186°C at 0.6 Torr.

The 1-aroyl-1-hydroxy-3-aminopropanes are prepared as described in the Italian Patent Application No. 23444 A/72 filed 22.4.1972.

EXAMPLE 2

4-phenyl-5-B-(4-phenyl-piperazino)-ethyl-4-oxazolin-2-one

A solution of 7.5 g of 4-phenyl-5-chloroethyl-4-oxazolin-2-one, 10.8 g of N-phenyl-piperazine, and catalytic quantities of potassium iodide (KI) in 150 cc. of toluene is agitated for 20 hours. It is filtered and the filtrate extracted with dilute HCl. The aqueous phase is rendered alkaline with ammonia. The precipitated solid is filtered; m.p. = 188°C (by alcohol). The 4-phenyl-5-chloroethyl-4-oxazolin-2-one is prepared in the following manner: to 65 cc. of a 20% solution of phosgene in toluene, agitated and cooled to 0°C, are added over 20 minutes a solution of 21.3 g of 1-benzoyl-1-hydroxy-3-chloropropane, and 14.3 g of triethylamine in 200 cc of anhydrous chloroform. It is agitated for 6 hours at ambient temperature, cooled to 0°C, and saturated with gaseous ammonia. It is left under agitation for a further 3 hours at ambient temperature and then filtered. The filtrate is dried and the residue dissolved in benzene, washed with water and dried over $Na_2SO_4$ and evaporated to dryness. The residue is used for the reaction without further purification.

The 1-benzoyl-1-hydroxy-3-chloro propane, as described in the Italian Patent Application No. 23444 A/72 filed 22.4.1972 is prepared in the following manner: to a solution of sodium methylate, obtained by dissolving 3.52 g of sodium, in 130 cc. of absolute methanol, are added, all at once, at ambient temperature, 40 g of 1-benzoyl-1-bromo-3-chloro-propane (prepared from 1-benzoyl-3-chloro propane with bromine in acetic acid) dissolved in 110 cc. of absolute methanol.

The reaction mixture is left by itself for 3 days. The solvent is eliminated at reduced pressure and the residue is dissolved in diethylether and filtered. The filtrate, when evaporated to dryness under vacuum, gives an oily residue which is mixed with 100 cc. of dilute hydrochloric acid and maintained at 50°C for 30 minutes under agitation and then cooled. The product is then extracted with benzene and the organic phase separated, washed with water until neutral and dried over $Na_2SO_4$ for 2 days.

The solution is filtered, the filtrate is evaporated to dryness under vacuum and the oily residue is used directly for the reaction.

EXAMPLE 3

3-butyl-4-p-fluorophenyl-5-B-(4-phenyl-piperazino)-ethyl-4-oxazolin-2-one

A mixture of 10 g of 1-p-fluorobenzoyl-1-hydroxy-3-N-(N'-phenyl)-piperazino-propane and 3.5 g of butylisocyanate is heated in the molten state at 100°C for 2 hours and then cooled. The reaction mass is dissolved in benzene and filtered hot with animal charcoal. On adding hexane to the filtrate, a white solid precipitates which is recrystallised from alcohol and filtered. The solid is agitated in 120 cc. of acetic acid for 4 hours and the hot solution filtered with animal charcoal. The filtrate is dried under reduced pressure and the residue, dissolved in benzene, is washed with a dilute soda solution and then with water. The benzene phase is dried and evaporated to dryness under reduced = m.p. =71°C (by alcohol). The following are similarly prepared:

3-butyl-4-p-fluorophenyl-5-(1-(4-hydroxy-4-(p-chlorophenyl)piperidino)-ethyl)-4-oxazolin-2-one m.p. = 72°C (by alcohol)

3-methyl-4-p-fluorophenyl-5-diethylaminoethyl-4-oxazolin-2-one-citrate m.p. = 90°C (by alcohol)

3-phenyl-4-p-fluorophenyl-5-B-(4-phenyl-piperazino)-ethyl-4-oxazolin-2-one m.p. = 165°C (by alcohol)

EXAMPLE 4

3-acetyl-4-p-fluorophenyl-5-B-(4-phenyl-piperazino)-ethyl-4-oxazolin-2-one

A suspension of 7.5 g of 4-p-fluorophenyl-5-B-(4-phenyl-piperazino)-ethyl-4-oxazolin-2-one, 17.4 cc. of acetic anhydride and 1.63 g of anhydrous pyridine is heated over an oil bath at 130°C for 3 hours. The reaction mixture is evaporated to dryness under vacuum and the residue, dissolved in benzene, is washed with water. The dried benzene phase is evaporated to dryness at reduced pressure.

m.p. = 107°C (by hexane) Similarly the following are prepared:

3-acetyl-4-p-fluorophenyl-5-diethylaminoethyl-4-oxazolin-2-one b.p. = 180°C at 0.6 Torr.

3-acetyl-4-p-fluorophenyl-5-B-(4-o-methoxyphenyl-piperazino)-ethyl-4-oxazolin-2-one hydrochloride. m.p. = 222°C (by alcohol)

3-benzoyl-4-p-fluorophenyl-5-B-(4-phenyl-piperazino)-ethyl-4-oxazolin-2-one hydrochloride. m.p. = 233°C (by alcohol)

EXAMPLE 5

3-methylaminocarbonyl-4-p-fluorophenyl-5-B-(4-phenyl-piperazino)-ethyl-) 4-oxazolin-2-one hydrochloride.

A mixture of 4 g of 4-p-fluorophenyl-5-B-(4-phenyl-piperazino)-ethyl-4-oxazolin-2-one and 4.16 g of methylisocyanate is heated in a closed tube at 140°C for 90 minutes.

The reaction mass is treated with alcoholic hydrochloric acid m.p. = 209°C (by alcohol)

EXAMPLE 6

4-p-fluorophenyl-5-B-(4-o-methoxy-phenyl-piperazino)-ethyl-4-oxazalin-2-thione

A mixture of 2 g of 1-p-fluorobenzoyl-1-hydroxy-3N-(N'-o-methoxyphenyl)-piperazino-propane, 1.7 g of potassium isothiocyanate, and 1 cc of concentrated HCl in 40 cc. of ethanol is refluxed for a total of 40 hours.

The solution is concentrated to half volume, cooled and the precipitated solid filtered and dried. The solid is suspended in water, and the suspension, rendered alkaline with ammonia, is extracted with benzene a number of times. The benzene phase, dried and evaporated at reduced pressure, gives a solid.

m.p. = 180°C (by alcohol)

The following is similarly prepared:
4-p-fluorophenyl-5-B-(4-phenyl-piperazino)-ethyl-4-oxazolin- 2-thione. m.p. = 170°C (by isopropyl alcohol)

EXAMPLE 7

4-p-fluorophenyl-5-B-(4-phenyl-piperazino)-ethyl-2-imino-oxazoline

A solution of 5 g of 1-p-fluorobenzoyl-1-hydroxy-3-N(N'-phenyl)-piperazinopropane, 0.83 g of cyanamide, 10 cc. of $H_2O$ and 160 cc. of ethanol is refluxed for a total of 40 hours. The solvent is removed at reduced pressure. m.p. = 192°C (by alcohol).

EXAMPLE 8

4-p-fluorophenyl-5-B-(4-o-methoxyphenyl-piperazino)-ethyl-imino-oxazoline-2-imino-oxazoline A mixture of 12 g of 4-p-fluorophenyl-5-chloroethyl-2-imino-oxazoline hydrobromide and 21.4 g of o-methoxyphenylpiperazine in 200 cc. of toluene is refluxed for a total of 28 hours. The solid present is filtered and the filtrate is washed a number of times with water and then dried over $Na_2SO_4$.

The solvent is removed at reduced pressure. m.p. = 210°C (by alcohol). The 4-p-fluorophenyl-5-chloroethyl-2-imino-oxazoline hydrobromide is prepared in the following manner:

20 g of 1-p-fluorobenzoyl-1-bromo-3-chloropropane, 21.6 g of urea and 50 cc. of dimethylformamide are heated for 45 hours at 105°C.

The solvent is removed at reduced pressure and the residue is treated a number of times with diethyl ether and finally with acetone, filtered and used for the reaction without further purification.

We claim:

1. A 4-aryl-5-aminoalkyl-4-oxazolin-2-one selected from the group consisting of 4-p-fluorophenyl-5-$\beta$-(4-phenylpiperazino) ethyl-4-oxazolin-2-one, 4-p-fluorophenyl-5-$\beta$-(4-o-methoxy-phenyl-piperazino)ethyl-4-oxazolin-2-one, 4-phenyl-5-$\beta$-(4-phenyl-piperazino)-ethyl-4-oxazolin-2-one, 4-p-chlorophenyl-5-$\beta$-(4-phenyl-piperazino) ethyl-4-oxazolin-2-one, 4-p-methoxy-phenyl-5-$\beta$-(4-phenyl-piperazino) ethyl-4-oxazolin-2-one, 3-methyl-4-p-fluorophenyl-5-$\beta$-(4-phenyl-piperazino) ethyl-4-oxazolin-2-one, 3-ethyl-4-p-fluorophenyl-5-$\beta$-(4-phenyl-piperazino) ethyl-4-oxazolin-2-one, 3-butyl-4-p-fluorophenyl-5-$\beta$-(4-phenyl-piperazino) ethyl-4-oxazolin-2-one, 3-benzyl-4-p-fluorophenyl-5-$\beta$-(4-phenyl-piperazino) ethyl-4-oxazolin-2-one, 3-diethyl-amino-ethyl-4-p-fluorophenyl-5-$\beta$-(4-phenyl-piperazino) ethyl-4-oxazolin-2-one, 3-acetyl-4-p-fluorophenyl-5-$\beta$-(4-phenyl-piperazino) ethyl-4-oxazolin-2-one, 3-benzoyl-4-p-fluorophenyl-5-$\beta$-(4-phenyl-piperazino) ethyl-4-oxazolin-2-one, 4-p-fluorophenyl-5-$\beta$-[4-(2 pyridyl)-piperazino] ethyl-4-oxazolin-2-one, 4-p-fluorophenyl-5-$\beta$-(4-methyl-piperazino) ethyl-4-oxazolin-2-one, 3-phenyl-4-p-fluorophenyl-5-$\beta$-(4-phenyl-piperazino) ethyl-4-oxazolin-2-one, 3-methylamino-carbonyl-4-p-fluorophenyl-5-$\beta$-(4-phenyl-piperazino)ethyl-4-oxazolin-2-one, 3-acetyl-4-p-fluorophenyl-5-$\beta$-(4-o-methoxyphenyl-piperazino)ethyl-4-oxazolin-2-one, 4-p-fluorophenyl-5-$\beta$-(4-phenyl-piperazino)ethyl-4-oxazolin-2-thione, 4-p-fluorophenyl-5-$\beta$-(4-o-methoxyphenyl-piperazino)ethyl-4-oxazolin-2-thione, 4-p-fluorophenyl-5-$\beta$-(4-phenylpiperazino) ethyl-2-imino-oxazoline, 4-p-fluorophenyl-5-$\beta$-(4-o-methoxyphenyl-piperazino)ethyl-2-imino-oxazoline, and a pharmaceutically acceptable salt thereof.

\* \* \* \* \*